Figure 1:
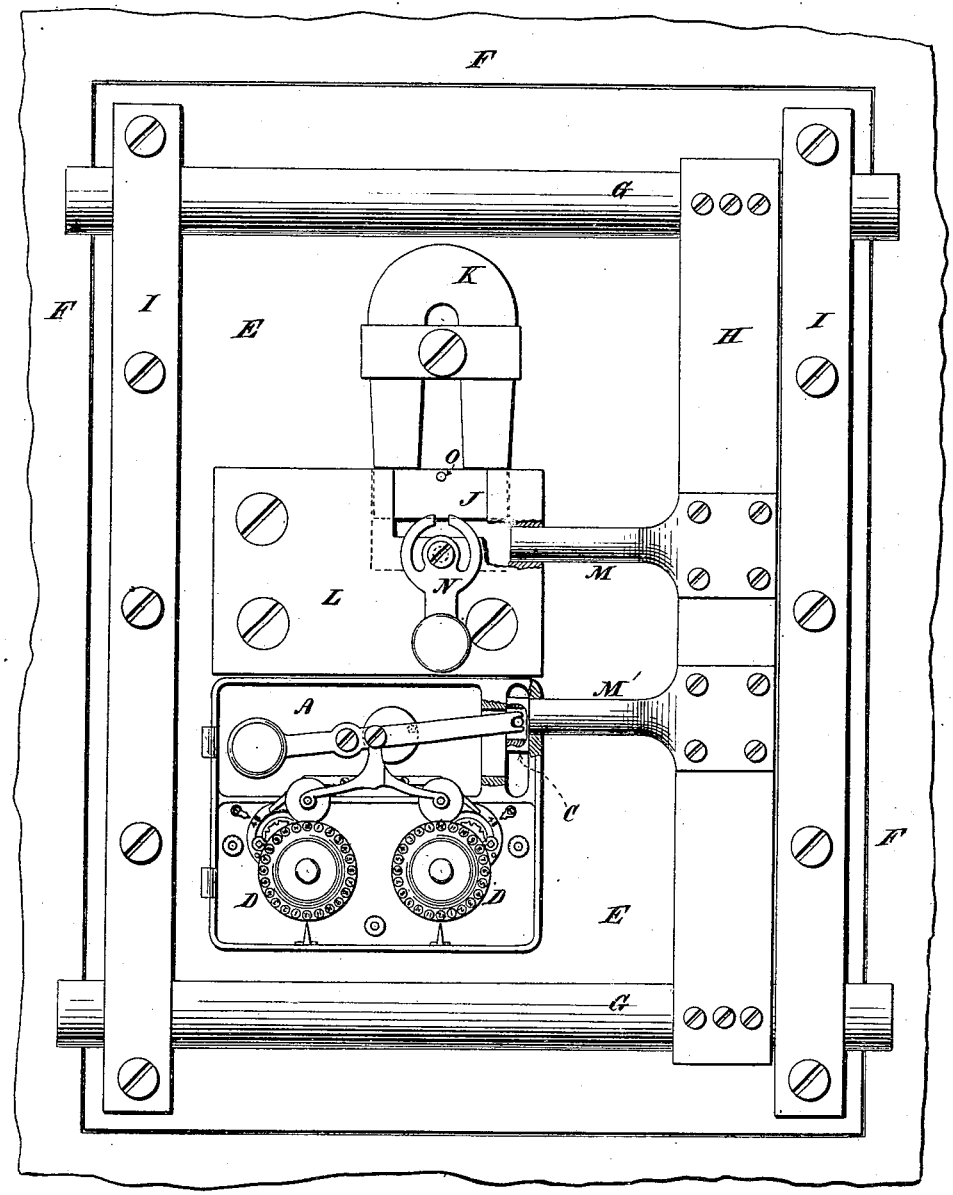

(Model.)

H. F. NEWBURY.
TIME LOCK.

No. 262,093.  
6 Sheets—Sheet 1.  
Patented Aug. 1, 1882.

Witnesses:  
Robt. H. Duncan  
Saml. A. Duncan

Inventor:  
Henry F. Newbury (Model.)
H. F. NEWBURY.
TIME LOCK.
No. 262,093. Patented Aug. 1, 1882.
6 Sheets—Sheet 2.
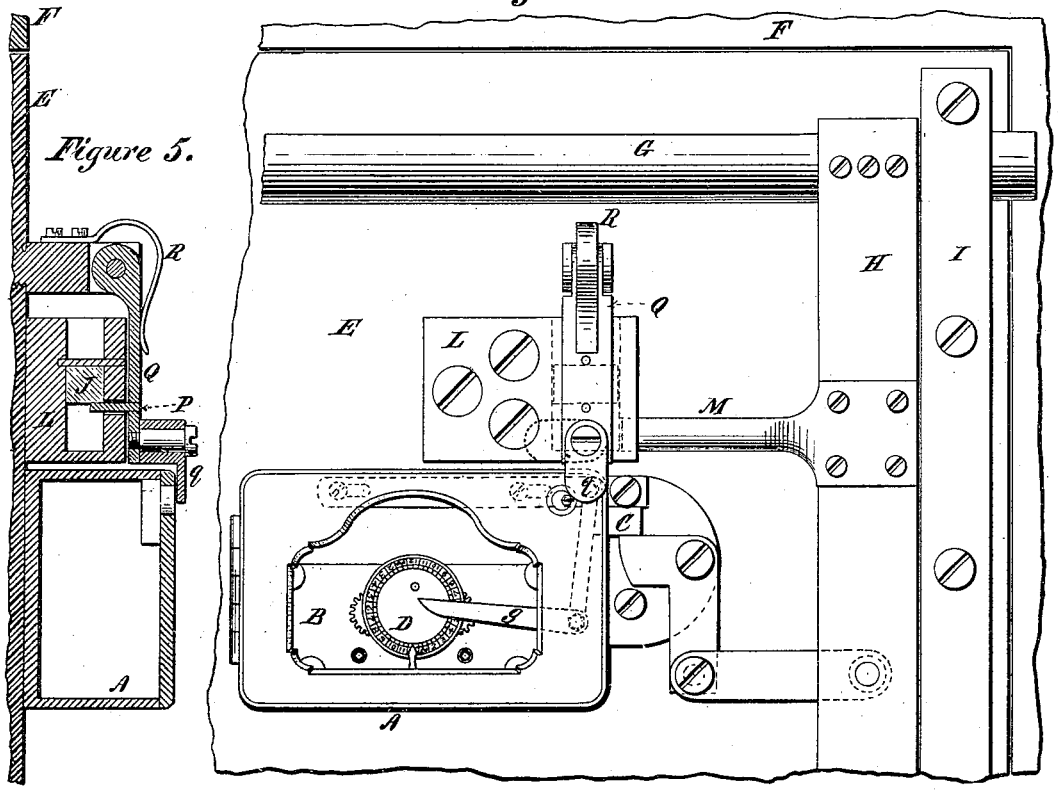
*Figure 4.*
*Figure 5.*
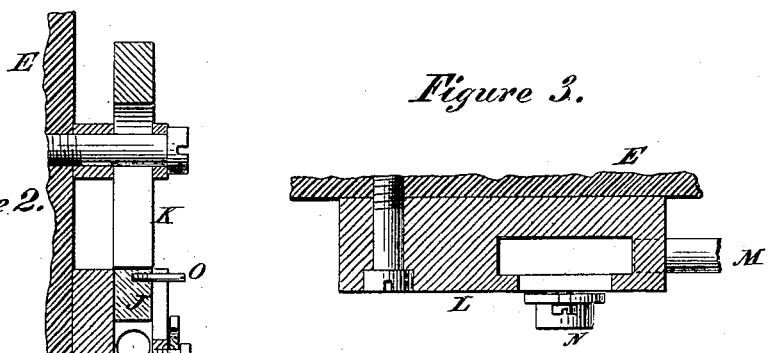
*Figure 2.*
*Figure 3.*
Witnesses:
Robt. H. Duncan
Saml. A. Duncan
Inventor:
Henry F. Newbury (Model.)
H. F. NEWBURY.
TIME LOCK.
No. 262,093. Patented Aug. 1, 1882.
6 Sheets—Sheet 3.
*Figure 6.*
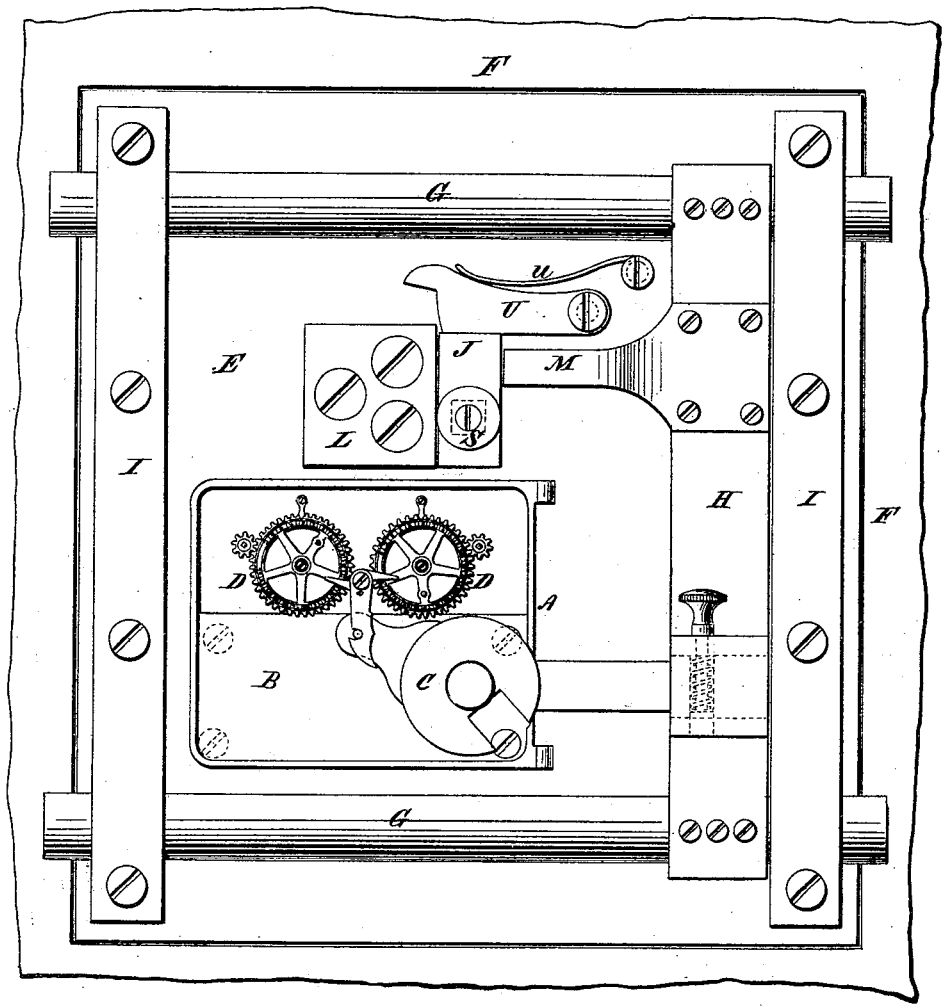
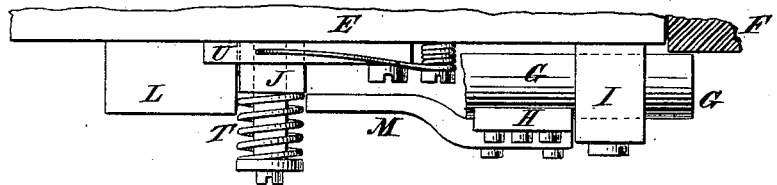
*Figure 7.*
Witnesses:
Robt H. Duncan
Paul A. Duncan
Inventor:
Henry F. Newbury (Model.)

H. F. NEWBURY.
TIME LOCK.

No. 262,093.   Patented Aug. 1, 1882.

6 Sheets—Sheet 4.

Witnesses:
Robt H. Duncan
Paul A. Duncan

Inventor:
Henry F. Newbury (Model.)
6 Sheets—Sheet 5.
H. F. NEWBURY.
TIME LOCK.
No. 262,093.
Patented Aug. 1, 1882.
*Figure 12.*
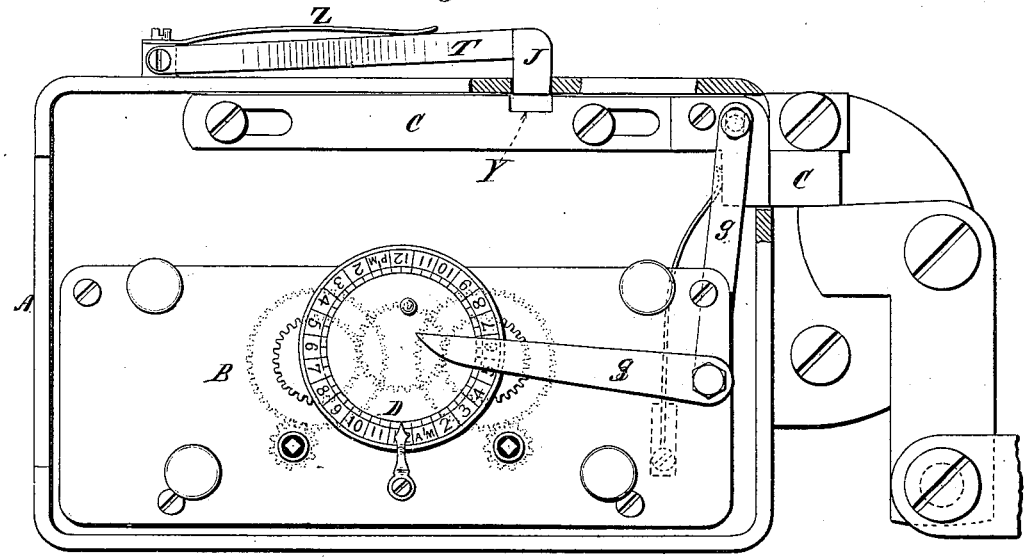
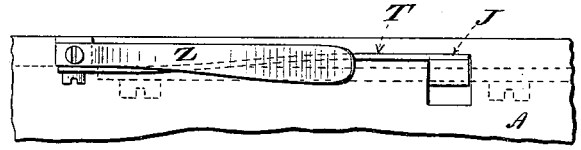
*Figure 13.*
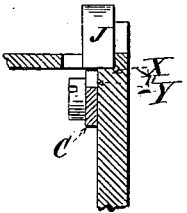
*Figure 14.*
Witnesses:
Robt H. Duncan
Paul A. Duncan
Inventor:
Henry F. Newbury (Model.)

6 Sheets—Sheet 6.

H. F. NEWBURY.
TIME LOCK.

No. 262,093.   Patented Aug. 1, 1882.

Witnesses:
Robt H. Duncan
Paul A. Duncan

Inventor
Henry F. Newbury

UNITED STATES PATENT OFFICE.

HENRY F. NEWBURY, OF BROOKLYN, NEW YORK.

TIME-LOCK.

SPECIFICATION forming part of Letters Patent No. 262,093, dated August 1, 1882.

Application filed June 20, 1881. (Model.)

*To all whom it may concern:*

Be it known that I, HENRY F. NEWBURY, of the city of Brooklyn, in the county of Kings and State of New York, have invented certain new and useful Improvements in Chronometric or Time Locks and the Mode of Mounting them (Case A;) and I do declare that the following is a full, clear, and exact description of my invention, and will enable others skilled in the art to which it appertains to make and use the same.

A chronometric or "time" lock, as the term is understood in the art of safe and vault protection, is a lock whose bolt or checking device (sometimes technically called "dog") is, for the purpose of unlocking, at least, under the control of a time-movement capable of withdrawing it automatically, or of permitting it to be withdrawn, from the locking position upon the arrival of the hour for which the mechanism has previously been set. By placing such locks upon the interior of the structures to be protected, and without mechanical connection with the exterior thereof, it has been supposed that an efficient security is provided against what are known as "masked burglaries," and that thus locks of this class afford a complete protection against the operations of the burglar, except when he resorts to violence calculated to force the walls of the safe or vault. I have discovered, however, that the security thus afforded is apparent only, and that any of the time-locks now upon the market, when mounted in the established way, can be defeated by the burglar without difficulty and without resort to force to break or penetrate the walls of the structure in which the lock is used. From this it results that practically a safe or vault guarded by a combination-lock has its security increased but little, if any, by the addition of any of the existing time-locks, and that the protection afforded by such time-lock alone is far less reliable than that afforded by an ordinary combination-lock alone. This defect in the existing chronometric locks as heretofore mounted arises from the frangible character of certain parts of the time-movement, which in all fine work are made so slight and delicate as to be broken readily by a sudden shock, such as might be communicated to them through the walls of a safe or vault by the explosion of a small charge of dynamite, nitroglycerine, or other quick explosive outside the walls of the structure, but in proximity to that part of the walls against which the lock is secured. The parts of a time-movement which are the farthest removed from the main wheel are the most delicate, and therefore the most easily broken, this being the case especially with the staff of the third wheel and with the pallet and escape-wheel staffs. The journals of these staffs, as ordinarily constructed, are made exceedingly small for the purpose of reducing the surfaces of contact, and thus the friction, to a minimum, and the finer the workmanship of the lock the slighter and more frangible are these parts likely to be. Any material increase in the extent of the bearings, whereby the strength of the parts would be augmented, would correspondingly increase the friction and impair the time-keeping properties of the movement. Time-locks with jeweled movements, also, are specially exposed to injury in the manner indicated, since the jewels, by reason of their brittleness, might easily be broken by the force of an explosion of great intensity in close proximity to them. The destruction of any of the parts intermediate between the balance-wheel and the main wheel at once releases the main wheel from the control of the escapement, and the movement immediately begins to "run down," a movement which otherwise would continue to run for several days without rewinding now running down in as many seconds.

As the dial or other device arranged to act upon the lock-bolt or dog to withdraw it or permit it to move from the locking position is actuated from the same spring that drives the main wheel, its speed will be correspondingly accelerated, so that the dog, instead of being withdrawn from engagement with the bolt-work of the door at the regular hour for which the lock has been set, will be withdrawn immediately upon the explosion or other shock, leaving the safe or vault, so far as the time-lock is concerned, entirely under the control of the burglar. If there are other locks on the door (either combination or key locks) the burglar will probably have effected the unlocking of them in advance of his attack upon the time-lock, either by picking them or forcing them, or by threats compelling the co-operation of the custodian of the key or combination.

In whatever way this may be done the subsequent unlocking of the bolt of the time-lock in the manner indicated (and repeated experiments show that this can readily be done with a charge of dynamite so small as to make but little noise, and not even indent or otherwise appreciably affect the walls of the safe) removes all obstruction to free access to the valuables placed under the protection of such lock.

The present invention relates to a means of securing the door of the safe or vault in case the time-lock guarding the same be subjected to a sudden shock, as above explained, sufficient to release the main wheel of the time-movement and permit the movement to run down, and thus effect the withdrawal of the lock-bolt from the locking position; and the invention consists in arranging, in combination with the time-lock, a supplemental bolt or checking device so constructed and arranged that it will, under ordinary circumstances, be inactive to control the movement of the bolt-work of the safe-door, but will also be capable of being brought into action, so as to serve as a dog, guard, or check to prevent the retraction of the bolt-work by the same shock that will suffice to break or displace any of the staffs of the train of the time-lock itself, or otherwise interrupt the continuity of such train. This supplemental guard or check, during the normal operation of the time-lock, is held out of action by any suitable latch or detaining device, the details of which may depend largely upon the mere choice of the constructer. Such detent may be so arranged as to be capable of yielding under the force of a sudden shock, such as is calculated to derange the time-movement of the lock, and of thereby permitting the supplemental bolt or checking device to be moved into the path of the bolt-work of the door, or of some part of the time-lock itself, or of some device intermediate between the time-lock and the bolt-work of the door. Instead of this, again, the supplemental checking device may be simply placed upon a shelf or ledge, from which it can be thrown by the force of the explosion, and thence descend by suitable ways to the point where it is to act to prevent the retraction of the bolt-work. So, also, as shown in Figure 1 of the accompanying drawings, it may be held in its normal position by the force of a magnet, from which it is to be discharged by a sudden shock; or it may be sustained in its normal position by any fragile support capable of being broken by a shock that would also cripple the time-movement.

In the accompanying drawings there are shown several arrangements of supplemental locking mechanism adapted for use in connection with a time lock for the purpose above indicated.

Corresponding parts in the several figures are designated by the same letters.

In these drawings, A represents the time-lock; B, the time mechanism of the same; C, the lock-bolt, and D D the revolving dials that are driven by the mainspring of the time-movement, and act to withdraw or permit the withdrawal of the lock-bolt from the locking position. E is the safe-door; F, the door-frame; G G, the ordinary train-bolts, united by the carrying or tie bar H and moving in the bolt-bars I I. J is the supplemental bolt or dog, to which the invention particularly relates.

Referring to the drawings more in detail, Fig. 1, Sheet I, shows the supplemental bolt J as having the form of a solid block of soft iron or equivalent metal, and held in its normal position by a magnet, K. A case, L, provided with suitable ways and affixed to the door of the safe, guides this block in its descent. When detached from the magnet by any sudden shock it falls in front of the stud or tongue-piece M, attached to the tie-bar H, and thus serves effectually to block the bolt-work, even if, as above explained, the same shock should greatly accelerate the movement of the dials D D, and thereby withdraw the main dog or lock-bolt C of the time-lock from its position in front of the stud M' before the proper hour therefor arrives. N is a slotted pendulum attached to the case L, and designed to prevent the block J from returning to its former position if the safe should be turned bottom side up. In such case the bob of the pendulum would cause it to swing on its pivot, and thus engage with a pin, O, projecting from the face of the block. A similar pendulum-detent may, if desired, be used in connection with the various forms of supplemental locking device shown in the other figures of the drawings. Fig. 2, Sheet II, is a central vertical section of the supplemental locking mechanism shown in Fig. 1; and Fig. 3, Sheet II, is a horizontal section of the case L of the same, showing in plan the pendulum and the end of the stud M.

Figs. 4 and 5, Sheet II, show in elevation and central vertical section, respectively, another mode of operating the supplemental checking device J in direct connection with a stud affixed to the bolt-work. In this case the block J is held in its normal position by means of a pin, P, affixed to a hinged and jointed arm, Q, the lower member of which, q, extends down in front of the door of the time-lock. Any shock directed against the back of the lock sufficiently strong to throw open the door of the lock-case would inevitably swing the arm Q on its hinge in opposition to the resistance of the spring R, and thus withdraw the pin P from beneath the block J, permitting the latter to drop in its ways into place in front of the stud M'. The return of the arm Q under the recoil of the spring R, after the escape of the lock-door from under the lower end of the arm Q will bring the pin P into place above the block J, and thus this pin will serve as a stop to prevent the block from being removed from the stud M by overturning the safe. By making the arm Q, jointed its lower member, whenever it is desired, may be turned up, as shown in dotted lines in Fig. 4, so as to permit the door of the lock to be opened without interfering with the supplemental locking mechanism. Of course it is assumed that with this form of the invention any shock sufficient to break the parts of the time-movement will be also sufficient to throw open the door of the time-lock. To this end the door of the lock should be fastened but slightly in any suitable manner securing this result.

Figure 8:
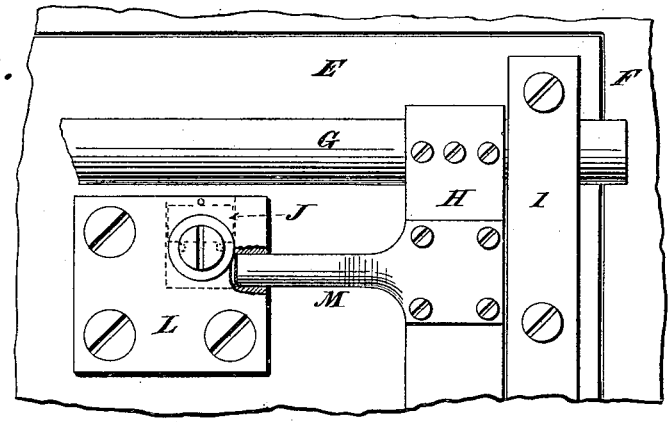
Figure 9:
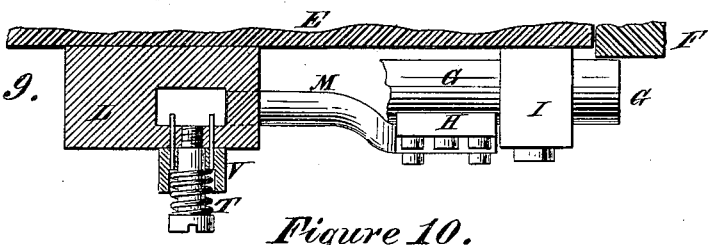
Figure 10:
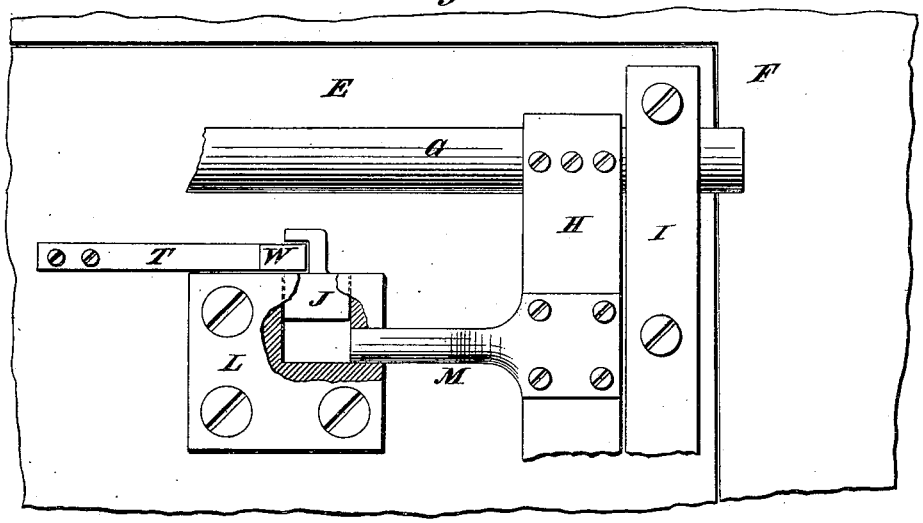
Figure 11:
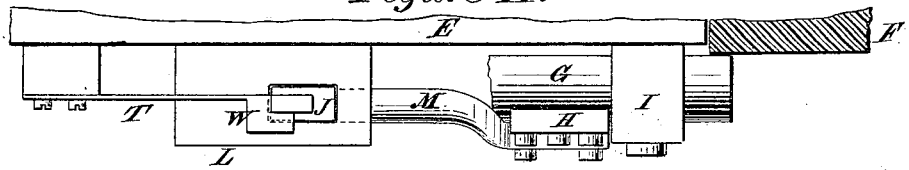

Figs. 6, 8, and 10 show in elevation three other forms of the invention, in each of which the supplemental lock operates directly upon the tongue-piece of the bolt-work, Fig. 7 being a plan of the supplemental locking mechanism shown in Fig. 6, Fig. 9 being a horizontal section of that shown in Fig. 8, and Fig. 11 being a plan of that shown in 10.

In Figs. 6 and 7, Sheet III, the block J is mounted loosely upon the headed screw-bolt S. Under ordinary circumstances the spiral spring T, pressing against the block J, holds it out of the path of the stud M. A sudden shock, however, coming from behind at a time when the bolt-work and its attached stud M are in their advanced position, as shown in the drawings, will throw the block J forward against the resistance of the spring and directly into the path of the stud M. Immediately upon this occurring the pivoted block U falls of its own weight and by the aid of the spring $u$ behind the block J and prevents its return, and the spring $u$ holds the latch-block U in such position, even if the safe be turned bottom up. As it is shown in Figs. 6 and 7, the part marked L is simply an abutment to resist the thrust of the bolt-work upon the block J.

In Fig. 8, Sheet IV, the block J is shown as held up in its normal position by means of two pins attached to a supplemental block, V, which is pressed against the case L by the spiral spring T, as shown in horizontal section in Fig. 9. In this case a heavy shock acting upon the mechanism from behind will force the block V inward, compressing the spring and withdrawing the pins from beneath the block J. This latter thereupon falls in front of the stud M, and thus locks the bolt-work of the door. The recoil of the spring will return the block V to its former position, and this will force the pins back and above the block J, and thus prevent the latter from being removed from the stud M by overturning the safe. The block V should be of some heavy material, and is used to secure a momentum, which perhaps could not be acquired by the pins alone if they were attached directly to the spring T.

In Figs. 10 and 11, Sheet IV, the block J is held up in its normal position by means of a flat spring, T, which takes under a hook on the block J. To secure sufficient momentum to insure the requisite inward movement of this spring when subjected to the influence of a shock acting from behind, the end of the spring may be weighted, as shown at W. The shock throws this heavy end forward, which lets the dog J drop. The recoil of the spring will bring the end W above the hook on J, and thus prevent the block J from being removed from the stud M in case the safe should be turned bottom up.

In the several forms of the invention above described the supplemental locking device J is shown as acting upon a stud attached directly to the bolt-work of the safe-door. Manifestly the same principle would be involved if this supplemental device were made to engage with the bolt of the time-lock, or, again, with some portion of the train of the time mechanism of the lock. By thus blocking the lock-bolt or the train that moves the lock-bolt the door-bolts will be as effectually blocked—more so, in fact—as if the supplemental locking device were applied directly to the latter.

Figs. 12, 13, and 14, Sheet V, show in elevation, plan, and vertical section, respectively, the supplemental locking-block J, arranged to engage with the bolt of the time-lock. This block, as here shown, is mounted upon a flat pivoted spring, T, and in its normal position it rests upon a ledge in the back wall of the lock-case, as shown at X in Fig. 14. When dislodged from this ledge it falls into the recess Y in the lock-bolt C, and thus effectually prevents retraction of the latter by the action of the time mechanism and dial D. The spring Z serves to hasten the descent of J, and also to hold it securely in engagement with the lock-bolt.

Figure 15:
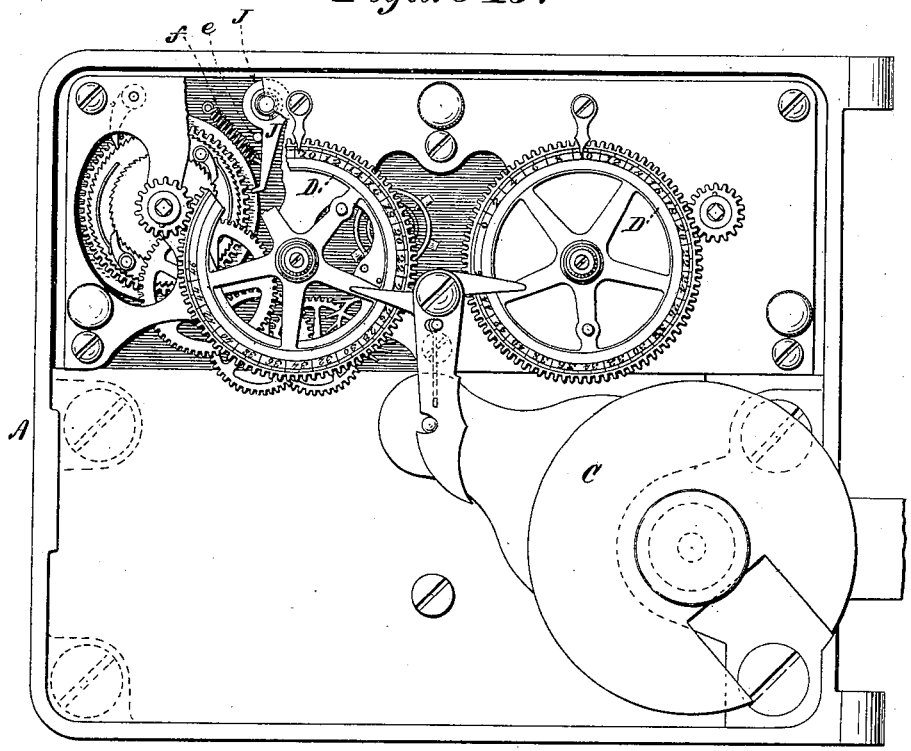
Figure 16:
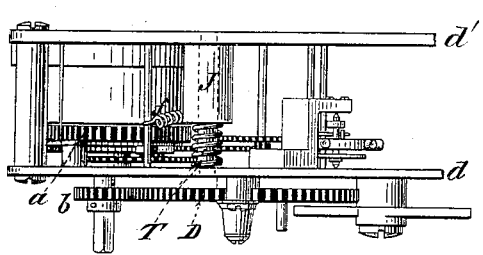
Figure 17:
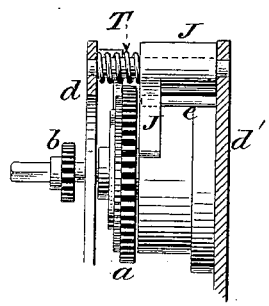

Figs. 15, 16, and 17, Sheet VI, show the supplemental locking device J as applied directly to the train of the time mechanism, Fig. 15 being a front elevation of a time-lock and its case, the door of which has been removed, Fig. 16 being a plan of a part of the time-movement, and Fig. 17 being an end elevation of certain parts shown in Fig. 16. In these figures $a$ represents the main wheel of the time-movement, and $b$ is a pinion on the main arbor, which drives the dial D. The supplemental locking device J is made in form of a heavy sleeve with a hooked arm, and mounted loosely on a pin extending between the two plates $d$ $d'$, that form the frame of the time-movement. The sleeve portion of the device J is shorter than the pin on which it is mounted, as shown in Fig. 17, and in the normal position of the parts the spring T presses the device J back against the back plate, $d'$, which keeps the hook part of J in a vertical plane behind the plane of the main wheel $a$. While in this position also the hooked arm of J rides on the pin-rest $e$, being held in contact therewith by the spring $f$. A violent shock applied to the back of the lock will throw the sleeve J forward, contracting the spring T and letting the hooked arm of J drop off from the end of pin e, when it will at once be drawn toward the main wheel by the spring f, and its hook thereby caused to engage with the teeth of the main wheel. This will arrest the revolution of the main wheel, even if the same shock should break all of the delicate staffs of the movement, and of course the revolution of the dial D will cease and the lock-bolt C will remain in its locking position.

Although the lock illustrated in Fig. 15 is provided with two time-movements, the supplemental locking mechanism is shown as applied to one of them only. In practice, however, both of the movements should have the attachment.

Whatever may be the precise construction chosen for the supplemental locking mechanism, the bolt or dog of such supplemental mechanism, or at any rate the spring-detent or other equivalent part of such mechanism, should be placed in proximity to the time-lock. The action of the quick explosives which burglars would be likely to use to cripple a time-lock by transmitting a shock through the walls of the safe is so intensely local, by reason, in large part, of its suddenness, that if both the dog and the dog-detent of such supplemental mechanism were too far removed from the time-lock the mechanism would fail to respond to an effective explosive against the latter. It is also to be observed that the farther the supplemental mechanism is placed from the time-lock the more delicate its adjustment must be made, and thus the greater will be the liability of its being brought into action accidentally. It is preferred to introduce either the dog or the dog-detent of the supplemental mechanism into the very structure of the lock, as shown in Fig. 15, or to place it in actual contact with the lock, as shown in Figs. 4 and 12; but a position somewhat removed from the time-lock, as shown in Figs. 1 and 6, may also be adopted, and the desired protection thereby be obtained.

It will be apparent that the improvement hereinbefore set forth is applicable to any of the existing time-locks. For example, in Figs. 1 and 6 it is shown in connection with the well-known Yale lock, in Fig. 15 in connection with the Sargent lock, and in Figs. 4 and 12 in connection with the Holmes lock. The operation of these locks is too well known to persons skilled in the art to require special explanation here. In Figs. 4 and 12 the bent lever g, by which motion is communicated from the dial D to the lock-bolt C, is shown in front of the dial rather than behind it, which latter is the position it occupies in the locks as put on the market. This change is made for greater distinctness.

What is claimed as new is—

1. The combination of a chronometric or time lock, and a supplemental locking-mechanism consisting of a dog or check and means for holding such dog or check out of action during the normal condition of the time-lock, some part of this supplemental mechanism being arranged in proximity to the lock, substantially as set forth, whereby the supplemental dog or check will be brought into action to prevent the retraction of the door-bolts of the safe or vault on which the time-lock is used on the occurrence of a shock capable of breaking or displacing the parts of such lock.

2. The combination of a chronometric or time lock, and a supplemental guard or check provided with a spring-stop or equivalent detent of convenient construction arranged to hold such guard or check, under the normal action of the mechanism, out of engagement with the bolt-work of the safe or vault door on which the lock is used, or with the parts controlling such bolt-work, but also adapted to yield upon the occurrence of a shock capable of breaking or displacing the parts of the movement, and thus release such supplemental guard or check and permit it to come into action to prevent the retraction of the bolt-work, substantially as described.

3. In combination with a chronometric or time lock, and a supplemental guard or check to prevent the withdrawal of the bolt-work of the safe on which such lock is used in case the parts of the time-movement become broken or displaced by a shock, a latch or stop to prevent the return of such supplemental guard or check to its normal condition.

4. In combination with a supplemental guard or check designed to prevent the withdrawal of the bolt-work of a safe or vault door upon the breaking or displacement of the parts of the time-lock in such safe or vault, a pendulum latch or detent for holding such supplemental guard or check in its locking position, substantially as described.

HENRY F. NEWBURY.

Witnesses:
SAML. A. DUNCAN,
ROBT. H. DUNCAN.